C. ELLIS.
PROCESS OF MAKING CEMENT CLINKER AND APPARATUS THEREFOR.
APPLICATION FILED MAY 14, 1906.
934,056.
Patented Sept. 14, 1909.
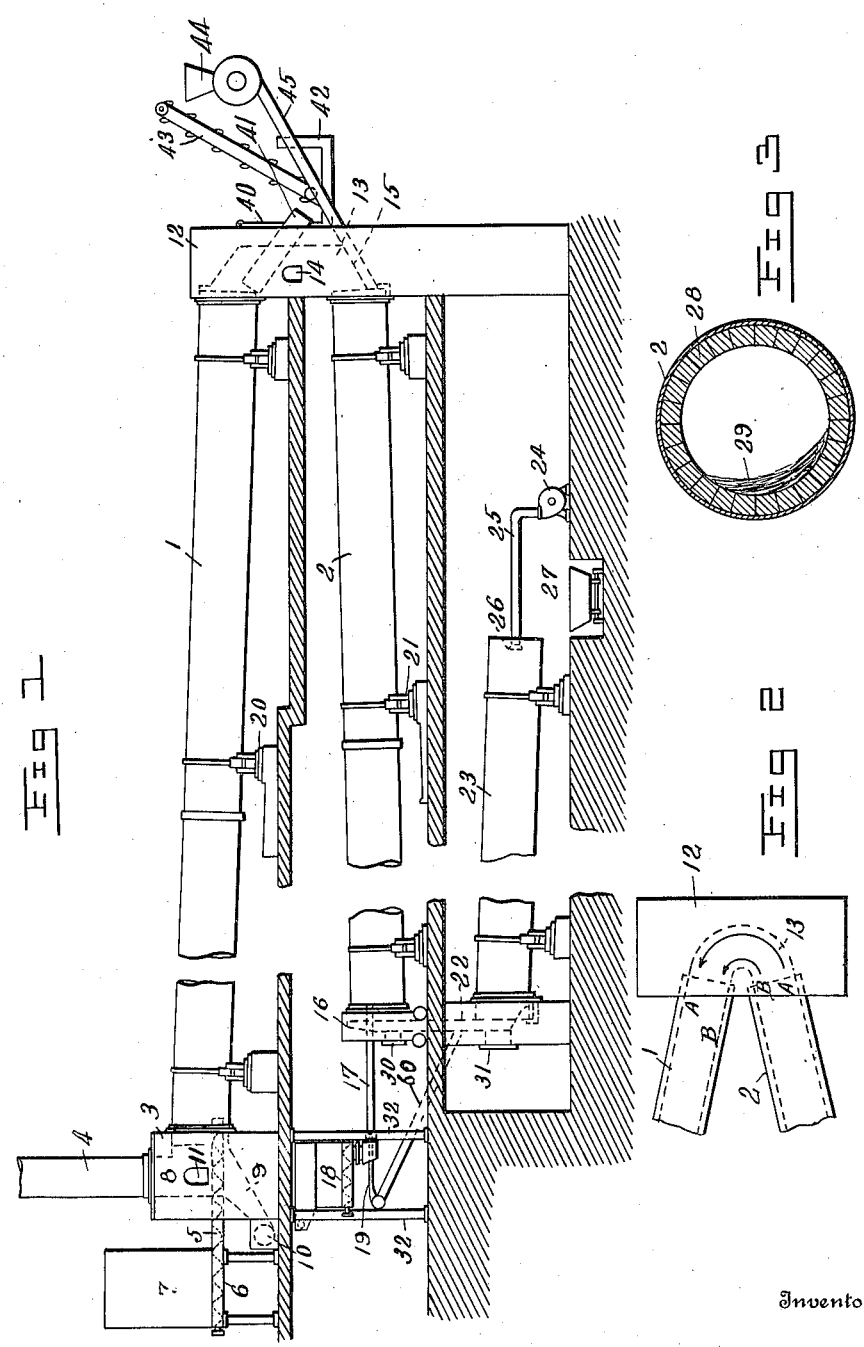

UNITED STATES PATENT OFFICE.

CARLETON ELLIS, OF WHITE PLAINS, NEW YORK, ASSIGNOR, BY DIRECT AND MESNE ASSIGNMENTS, TO PINE STREET PATENTS COMPANY, A CORPORATION OF NEW JERSEY.

PROCESS OF MAKING CEMENT CLINKER AND APPARATUS THEREFOR.

934,056.  Specification of Letters Patent.  Patented Sept. 14, 1909.

Application filed May 14, 1906. Serial No. 316,740.

*To all whom it may concern:*

Be it known that I, CARLETON ELLIS, a citizen of the United States, residing in White Plains, county of Westchester, and State of New York, have invented certain new and useful Improvements in Processes of Making Cement Clinker and Apparatus Therefor; and I do hereby declare the following to be a full, clear, and exact description of the same, such as will enable others skilled in the art to which it appertains to make and use the same.

This invention relates to processes of making cement clinker and apparatus therefor;
and consists in certain novel means and methods for converting raw cement materials into finished clinker; all as more fully hereinafter set forth, matters of novelty being particularly pointed out in the appended claims.

At present, cement clinker is generally produced in this country by passing the dry, finely powdered raw materials down and through a rotary inclined kiln past a flame burning at or near the mouth thereof and regulated to produce a clinkering heat in its vicinity. Said materials are generally a mixture of limestone and argillaceous silicates or "clay", either artificially or naturally produced, as in the "cement rock." Although any form of calcium carbonate, chemically considered, should do as well as limestone, as, for instance, marl, limestone is generally preferred in making artificial mixtures since its comparatively great density makes it suitable to the exigencies of the ordinary kiln, which must give a large output and yet must transmit material through it in a comparatively thin traveling layer. For similar reasons slate is often preferred to clay in such artificial mixtures. In making Portland cement from natural mixtures of calcium carbonate and argillaceous silicates such as "cement rock" since the composition is rarely that corresponding to the best cement, correcting additions of either the one component or the other are generally made to rectify such composition. In the kiln, the reactions occurring are many and diverse, but for convenience they may be grouped into two classes; calcining and clinkering. Clinkering is the operation by which free lime unites with the silica, argillaceous silicates and alumina of the clay, slate, etc., to form the peculiar calcareous compounds whose presence confers setting qualities on the finished cement. Calcining is the reaction by which the carbonates of the limestone are freed of their carbon dioxid, and the lime, magnesia, etc., set free. Clinkering requires an enormously high temperature, approaching 3000° Fahr., but absorbs little heat, probably even liberating some. This high temperature is necessary to frit or soften the argillaceous silicates of the clay and slate components and place them in condition for chemical union with the lime. Calcining on the other hand, takes place at comparatively low temperatures but absorbs much heat, being endothermic. And like all endothermic reactions, it is slow, good calcination with effective utilization of heat requiring a relatively long period of time, even where the materials, as is usually the case in cement making, are very finely powdered.

Whatever the origin of the cement materials, they are invariably introduced into the kiln in the form of a very fine, well mixed powder; frequently so fine as to allow 90 per cent. to pass through a 100-mesh sieve. This fine-grinding is for a number of reasons. One is that in the clinkering operation the cement-forming ingredients (that is, the lime and the argillaceous silicates) must be presented to each other for mutual reaction in the form of uniformly and homogeneously admixed, very fine powders. Solids as solids do not react on each other to any extent ordinarily and the degree of liquefaction or sintering in the clinkering zone cannot be allowed to go very far without danger to the quality of the clinker. The reaction of particles of cement materials on each other is therefore largely superficial, and if a particle of clay or lime, for instance, be comparatively coarse, it will only be converted superficially, leaving a kernel or core of unconverted material; this being particularly the case if the calcination is not complete at the time of clinkering since calcination absorbs heat and therefore prevents interior penetration of the clinkering heat into such a particle. Another reason for the fine grinding, is that the cement kiln as ordinarily operated and constructed is not a good calciner, too little time being afforded and the contact of the hot gases with the calcining material not being good, so that it is usually supposed that it is better to increase the surface exposure by such fine grinding. This reasoning, however, is not quite correct since the finer the powder under the conditions in the calcining zone the slower is the penetration of heat. In the traveling stream of flour-like material in the calcining zone, there is a heat-absorbing liberation of carbon dioxid (calcination) and this comparatively cool heavy gas remains in the stream as a bathing gas layer, retarding the evolution of more carbon dioxid under the ordinary laws of mass action, preventing the access of the hot flame gases to the surfaces of the calcinating material and taking up the communicated heat from such gases.

In the ordinary operation of the ordinary kilns, as a matter of fact, the diverse requirements of the various operations are not well met, attention being directed mainly to the clinkering and the calcination being allowed, more or less, to take care of itself. The flame of aerially-suspended fine fuel burning in the mouth of the kiln which is customarily employed, affords the necessary high temperature for the clinkering and the hot gases coming from it are allowed to do what calcining they will, completion of calcination being done in the clinkering zone proper under the influence of the clinkering flame. Unfortunately, as stated, in such ordinary kiln processes, the time afforded for calcination is not sufficient nor are other conditions suitable. In the ordinary operation of the ordinary kiln, of the 35 per cent., or thereabouts, of carbon dioxid present in the original raw materials, at times a third or quarter remains after the material passes through the calcining zone and enters the clinkering zone proper. The result is a sudden chilling at this point as the silica and argillaceous silicates begin to act upon residual unchanged carbonate with expulsion of carbon dioxid, with the production of "rings" in the kiln, superficially fritted and inwardly unchanged lumps, etc. Another serious trouble is due to the dusting. As stated, the material is very finely powdered and the gas evolved in the traveling mass lifts more or less of it as dust and delivers it to the draft to be carried forward toward the stack. This is one of the reasons why heat regenerators, recuperators and the like have never been practicable with rotary cement kilns since the evolved dust quickly clogs them.

By omitting the fine-grinding of the materials preliminary to the beginning of calcination and reserving it to a later stage, many of the disadvantages of the ordinary operation are avoided and a number of new advantages gained. The preliminary fine-grinding is an expensive operation. Raw cement rock is usually a very hard material, requiring the expenditure of much power and the use of costly apparatus to reduce it to the usual flour-like fineness; and the same is true of the limestone and of the slate employed in artificial mixtures, or in supplementing the natural mixtures. Clay is easier to grind than slate but because of its greater volume as compared with slate, the latter is often used. Furthermore, in this preliminary grinding an unduly large amount of material must be handled since the raw material represents a much greater weight than appears in the finished product. In calcination nearly half of the calcium carbonate component (44 per cent.) disappears, being liberated as carbon dioxid which goes off with the stack gases, and since the calcium carbonate forms about two-thirds of the total mixture, the diminution of weight in the kiln from this reaction is large. There is also a diminution in weight due to dehydration and drying. Counting all sources of loss of weight, it may be said that it ordinarily requires about 600 pounds of raw material to make a barrel of cement (380 pounds). It follows therefore that without considering the great hardness of the raw materials, it requires much more grinding capacity and power to reduce such materials to fine powder than would be required were they previously calcined. But the saving in power and grinding capacity by postponing fine comminution till after much or all the calcination is effected, is much greater than is due to the lessening in bulk and weight. Though the original materials as stated, are often very hard and dense, after a preliminary calcination they are made minutely porous through the escape of carbon dioxid and become easily frangible, so that they are readily comminuted to any fineness desired with a fraction of the power originally required. While it is preferable to produce a complete, or substantially complete, calcination prior to fine grinding any calcination with expulsion of carbon dioxid is useful in this respect as lessening the weight to be handled and as making the material easier ground. In the present invention, therefore, the original raw materials, which may be cement rock, mixtures of such rock with clay, slate, limestone, etc., or direct mixtures of any kind of calcareous materials with argillaceous material, are merely coarsely crushed or broken and then calcined as a traveling stream in a rotary cement kiln apparatus by flame gases coming from the clinkering flame. In doing this, there is but little dusting and it is possible to get a much better contact of the flame gases with the material than is possible with fine-powdered material forming a dense thin stream with evolving gas permeating its mass and acting as a shielding layer. After the calcination is partially or wholly effected, the material is removed from the kiln proper, sent through a fine-grinding apparatus and returned to the kiln for clinkering, all in continuous transit of such materials and with a continuous transit of flame and flame gases from the clinkering flame passing through such apparatus.

In the stated operation, I furthermore secure other economies in the hereinafter stated manner. Calcination, as previously stated, is very inefficiently performed in the ordinary kilns and the utilization of heat is not good, several times as much coal as is really necessary being used in making a barrel of cement. Waste gases are usually discharged at enormously high temperatures, usually well over 1500° F. One reason for this is the inefficient contact with the heat-absorbing calcining material usually secured in the upper part of the kiln, the gases passing through the kiln being stratified. The hot gases from the clinkering flame ascend into the arch of the kiln and are underlaid by a cooler stratum of the air brought into the mouth of the kiln by the injector of the flame, by the entrainment action of such hot gases and by the great stack draft caused by the discharge of very hot waste gases. The velocity of the draft current prevents much admixture of these strata. With the underlying cooler stratum mixes the stream of comparatively cool carbon dioxid resulting from the calcination. I have discovered that by admixing these strata, by procuring a more positive contact of hot gases with the material and by prolonging the time of contact, I can secure very much better results in calcination and in utilization of heat, discharging the waste gases at a temperature which is very much lower than is usual; even as much as 1000° F. lower; discharging such gases at, say, about 400° to 500° F., or the temperature necessary to secure a good stack draft. The period of contact of hot gases with the material undergoing calcination, I have discovered, should be at least seven times as long as the time of exposure of the calcines to the direct action of the clinkering flame; and the ratio may be greater with advantage. Operating in this manner and with the good utilization of heat stated, I am enabled to secure other desirable results, allowing me to pass the material to the clinkering zone in a completely calcined, comparatively hot condition and without the usual sharp temperature differential at the bounding line of the clinker zone and without the production of rings, etc. On the other hand, the gases leave the clinkering zone, where but little if any absorption of heat occurs in this method of operation, with their practically full complement of heat and produce a good and methodical calcining. With the gases, also, there is no sharp temperature differential at the bounding line of the clinkering zone and calcination consequently occurs in an even, regular manner, the per cent. of carbon dioxid in the calcining material progressively and regularly diminishing as such material travels forward under the influence of the regularly increasing temperature of the kiln gases. With a delivery of completely calcined material into the clinkering zone and the consequent abolition of the sharp temperature differential at its bounding line, the whole operation of the kiln becomes much more regular.

The desirable time-contact factor can be secured in a number of ways, several of which I have disclosed in my copending application, Ser. No. 316,148, filed May 10, 1906, wherein I claim broadly methods and means for securing such time-contact factor. One such means is to rearrange the conditions in the kiln so that the clinkering flame and the clinkering zone formed thereby shall occupy a less fraction of the total length of the kiln than is customary, such fraction not exceeding an eighth of such total length, and being preferably even a less fraction of such total length. Another way is to make the kiln in sections with material or gases, or both, traveling at different rates of speed through the sections wherein calcination and clinkering respectively occur. Using such a sevenfold time-contact, the calcination absorbs heat efficiently from the ambient gases and the latter may be discharged at 400° F. or below. As the gas temperature in the clinkering zone is in the neighborhood of 3000° F. the absorption of heat represents a great shrinkage in the gas volume between the clinkering zone and the end of the kiln; perhaps four-fifths of the volume disappearing. And if the same diameter of kiln be preserved throughout, this further means that in the upper end of the kiln the speed of travel of the gases will be reduced materially and the time contact-factor greatly increased over the nominal sevenfold figure above adopted. In a kiln operating in the described manner, the gases will be traveling swiftly in the clinkering zone where their volume is great as compared with the sectional area of the conduit offered while in the upper end of the calcining zone they pass at a relatively slow speed, giving a good time-contact factor. The cross-section of the chimney flue can of course be made suitable to the new volume of gases so as to preserve the proper draft through the kiln as a whole.

By using coarsely crushed material in lieu of fine-powdered in the calcining zone and by using the preferred sevenfold time-contact factor with its attendant slow travel of gases in such calcining zone, I gain the enormous practical advantage of a substantial freedom from dusting so that ordinary chimney stacks may be used and these made high enough to obtain proper draft with comparatively low-temperature waste gases. In this manner of operation the upper part of the kiln is its own dust collector, the dust picked up in the lower portion under the high speed of gas travel incident to the formation of a clinkering temperature being quietly dropped again as the heat of the gases is absorbed and they cool and contract and slacken in speed.

The regularity of operation of the kiln as a whole is also improved by the use of coarsely crushed material in the calcining zone since it is easier to obtain efficient contact of the hot gases with such coarse material than with a stream of fine powder permeated by and bathed in a body of its own evolved gas. The coarse material gives a slow and regular evolution of gas, which is swept away as fast as produced, and therefore the calcination is regular and progressive. Any residual carbon dioxid remaining in the reground material is easily removed upon the return of the fine-ground calcines to the kiln prior to their entry into the clinkering zone.

In the securing of good contact between the calcining material and the hot kiln gases, it is desirable to destroy stratification in such gases. With the material in comparatively coarse form and the good utilization of heat secured, this may be done without undue dusting though in the ordinary process bringing a current of very hot, swiftly moving flame gases, such as exists in the arch of the kiln, into immediate contact with flour-like material would cause considerable dusting. By arranging the kiln in a number of sections, preferably superimposed, connected by stationary housings good results are obtained in the homogenizing of the kiln gases. With superimposed sections connected by a vertical flue in a stationary housing, the hot gas stratum or flame coming from the lower section strikes the wall of this flue in a manner causing it to reverberate or rebound and tending to cause good admixture. Such a superimposition where two sections are used has the further advantage of bringing the feed and delivery of the kiln on the same side, facilitating supervision and reducing the cost of labor. And since all the dust will be at this end, the drive machinery can well be arranged at the other, giving an enormous practical advantage to such a structure as compared to other ways of positioning the sections. This construction of the kiln in sections connected by stationary housings is further convenient in removing the calcined material for regrinding; and for this purpose the superimposed arrangement is also desirable.

In the accompanying illustration I have shown, more or less diagrammatically, an embodiment of my new apparatus as adapted for use in the described process.

In this showing, Figure 1 shows a longitudinal elevation of a complete clinker-producing apparatus; Fig. 2 is a detail view intended to illustrate the reversal of gas strata in passing from one kiln section to another with superimposed kiln sections; and Fig. 3, is a cross section of the kiln in the clinkering zone showing the elevation of clinker caused by rapid rotation.

The structure shown in Fig. 1 comprises two superimposed kiln sections in open communication, the lower section being provided with firing means and the upper communicating with waste gas removing means. The two sections may be of unequal length with the upper section the longer. There may be more than two sections and other connections may be used, but two superimposed sections are desirable and convenient. With two sections connected as shown, the flow of the gases therethrough is reversed at the connecting housing in a manner tending to good admixture. The sections may be divided into subsections, each provided with its own drive means, where the total length of the kiln is considerable. The total length of the communicating kiln sections can be quite great with advantage, and is preferably much over a hundred feet to permit good and effective contact of the kiln gases with the calcining material and thereby cause concomitant utilization of heat and good calcination.

Withdrawal of calcined material for the purpose of regrinding should be through a stationary housing connecting two kiln sections; and with the superimposed arrangement shown the hot calcines are assisted by gravity in their passage to the regrinding means.

Where marl and similar bulky materials are to be treated it is very desirable to have part, at least, of the upper kiln section of increased diameter. After calcination the materials shrink considerably and take up less room. With other and less bulky materials, such as dense cement rock or limestone or as cement rock or limestone mixtures, such an increased diameter has the advantage of giving an increased holding capacity, enabling more material to be maintained in contact with the gases for the same longitudinal travel, and therefore increasing the time contact factor. Width of kiln is in some degree interchangeable with length in securing this time contact factor. And with the sectional kilns shown, since inclination and speed of rotation can be indepentlently varied, a wide kiln section may be used either for the upper or the lower section. But I prefer the wider to be the upper. Apart from its advantage with such bulky materials as the marl mixtures, and its advantage in regard to gas velocity, it is better to have more space in the upper kiln for the reason that the clinkering zone can handle more material than the calcining zone in kilns of the same diameter throughout. The coarsely crushed material occupies more space than the fine-ground and for this reason also it is desirable to have greater volume in the upper section.

Increased internal diameter in the upper kiln section may be obtained by lessening the thickness of lining or by widening the kiln section itself. The character of the lining of each section may be made such as will suit the character of the material handled therein.

In Fig. 1, 1 and 2 respectively designate the upper and lower kiln sections. The former is provided with a housing 3 at its upper end, with chimney stack 4 rising therefrom and a conduit 5 for raw material, containing screw conveyer 6, connected to bin 7. In the housing, chamber 6 is prolonged downwardly and sidewardly into a funnel shaped conduit 9 connected with conveying means 10, the purpose of this structure being to remove any dust that may come from the kiln or the feed means. Door 11 gives access to this chamber. The upper kiln section as here represented is about seven feet in diameter and has a thicker layer (not shown) of interior lining in its lower than in its upper portion, the heat in this lower portion being greater and the need for the heat insulation also greater, while increased capacity is useful in the upper portion, both for accommodating more or bulkier raw material and also as slowing down gas velocities.

At its lower end, the upper kiln section enters a stationary housing 12, containing a vertical shaft chamber 13, to which door 14 gives access. The upper end of the lower kiln section also enters this housing and the shaft chamber forms a flue carrying the hot flame gases from the lower section to the upper. The floor 15 of the shaft chamber is given a sharp angle to guide such material as may fall upon it into the lower kiln section. At the back of the housing is a rear door 40 and a sloping chute 41 extending to the end of the upper kiln section and adapted to catch calcined or partially calcined material delivered thereby and transmit it to recipient 42, whence conveyer 43 takes it to grinding mill 44. From the mill another chute 45, returns the reground calcines to the lower kiln section.

The lower kiln section shown is generally like the upper. At its lower end, it is inclosed by a hood 16 through which projects a coal or gas burner 17. This may be arranged so as to throw the flame some distance back, and for this purpose, if water jacketed, it may extend inward some distance. Whatever the total length of the kiln, the firing means should be arranged, as stated, to produce a clinkering zone of about one-eighth this length so that the material under treatment shall not be exposed to a clinkering temperature more than a seventh the time of its exposure to a calcining temperature. Coal may be fed to the burner 17 by the usual mechanism 18, the air necessary to carry it being furnished by pipe 19. Drive means are shown at 20 and 21.

The clinker falling from the mouth of the lower kiln section descends through shaft 22 down to and into the clinker cooler 23. This is also a rotating cylinder set at an angle. At its lower end it is provided with a fan 24 introducing air through pipe 25 ending in a bell mouth 26. From the cooler the clinker is removed by the usual conveyer 27. It is of course obvious that air sent into the said cooler is heated by the clinker and passing up the clinker shaft gains access to the kiln to aid in combustion. A portion of this hot air may be tapped into the fan furnishing the air for the coal blast as by valved pipe 60.

So far as may be, access of air to the kiln is restricted to that coming in with the coal jet and that passing in through the clinker cooler, and not more than enough to furnish ready combustion of the fuel is supplied, such as may gain access through the usual sighting and patching holes in the hood, being allowed for in calculating the air supply from the two sources.

The clinker cooler is provided with door 31. The upper kiln section is supported through the floor by pillars 32, of iron or steel, surrounded by a thick coat of concrete.

The operation of this sectional kiln is obvious. The use of hot air in limited quantities tends to obviate the stratification incident to allowing unlimited access of cold air permitted in the usual kilns. Such unlimited access of cold air as a distinct stratum is further precluded by the fact that the hot flame gases do not go to the stack as a distinct stratum carrying underlying air with it, the hot gases being mixed and merged and made to fill the barrel of the kiln in the calcining zone as well as being made to move slowly. Draft is rapid in the calcining zone and in the stack but being slowed down in the intermediate calcining zone cold air is not sucked in in any great amount. Shortly beyond the end of the flame, the kiln gases merge into a more or less homogeneous mass, the last traces of stratification being removed by the rebounding effect given by the stationary housing connecting upper and lower sections. In Fig. 2, this effect is shown graphically. The lower layer, A, of air, etc., in kiln section 2 tends to flow, as shown by the arrow, along the wall of the chamber 13 and gain the upper position in the kiln section 1, while the upper of hot gases 3 in kiln section 2 tends to flow into the lower part of kiln section 1. As the structural flow tendency is opposed to the natural tendency of hot gases to overlie colder, the result is a very thorough mixture at this point. To aid in making the gas mass homogeneous, the lower kiln may be rotated comparatively rapidly without fear of increasing dusting at the waste gas exit, as would be the case in integral kilns. This rotation may exceed one revolution per minute, and may even reach three revolutions per minute, the usual feed being restored by lessening the inclination of the kiln section. The upper kiln section, to further increase the mixing effect, may have a reversed direction of rotation.

The rapidity of rotation of the lower section has the further advantage that it carries the clinkering material up on the side of the kiln, permitting a direct impingement of the flame without danger to kiln or clinker. With this impingement less fuel is necessary in producing a clinkering heat and consequently less air need be drawn through the kiln while the heat units produced are sufficient for clinkering. However, an axial flame may be used if so desired. Fig. 3 shows the direct impingement. In this view, 28 is the usual kiln lining and 29 is the clinker layer carried up into the upper left quadrant of the kiln by the rapid rotation.

In the apparatus shown, the lower kiln section is set at a slightly less angle than the upper and is adapted to rotate at a higher rate of speed to carry up the clinker layer. The lower angle compensates for the increased speed in preserving uniform feed of material. The internal diameter of the kiln preferably increases from the lowermost to the uppermost section.

The production of the stated time-contact factor with an apparatus of the nature of that herein described is more specifically described and is claimed in my divisional application, Ser. No. 494,698, filed May 7, 1909.

What I claim is:—

1. In a cement clinker burning apparatus, means for calcining cement material in transit by flame gases, means for removing and regrinding the calcined material after expulsion of carbon dioxid therefrom and flame-heating means for clinkering the ground calcines, said means furnishing flame gases for the calcining means, all in continuous transit.

2. In a cement clinker burning apparatus, the combination with a rotary kiln having a section adapted for calcining and another and communicating section adapted for clinkering, of means for removing, regrinding and returning material intermediate such sections and firing means common to and heating both such sections.

3. In a cement clinker burning apparatus, the combination of a plurality of connected rotary cylinder sections, one such cylinder being adapted for calcination and another for clinkering, with means for removing and regrinding material delivered by the first cylinder and returning the ground material to such other cylinder and firing means heating both such cylinders.

4. In a cement clinker burning apparatus, the combination of a plurality of connected rotary cylinder sections, one such section being adapted for calcination and another for clinkering, the former section being mounted above the latter and connected therewith by a housing forming a connecting conduit for the continuous passage of flame and flame gases from the latter to the former, firing means for the clinkering section furnishing hot gases for the calcining and means for removing calcined materials from the calcining section through said housing, regrinding and returning to the clinkering section.

5. The process of producing cement clinker which consists in calcining the raw cement forming materials in a rotary kiln to practically complete expulsion of $CO_2$, grinding and mixing the same, and returning to a rotary kiln and reheating to form clinker, said calcining and reheating being performed by a common source of heat.

6. The process of producing cement clinker which consists in calcining the raw materials in a rotary kiln to secure expulsion of $CO_2$, grinding and mixing the same and returning to a rotary kiln and reheating to form clinker, said calcining and reheating being performed by a common source of heat.

7. The process of producing cement clinker which consists in calcining raw materials in a coarsely ground condition, fine grinding and mixing the calcines, and reheating the powder to form clinker, said calcining and reheating being performed by a common source of heat.

8. A continuous process of making Portland cement clinker consisting in passing raw material through a primary rotary kiln, then pulverizing said material, then passing said pulverized material through a secondary rotary kiln, and during the passage of the material through said kilns passing in continuous succession through said kilns a volume of flame and flame gases, clinkering the pulverized material in the secondary kiln, and driving the carbon-dioxid from the raw material in the primary kiln.

9. The continuous process of making cement clinker which comprises passing a stream of raw cement material through a primary calcining rotary kiln section, through a regrinding apparatus and through a secondary rotary clinkering kiln section, and passing a current of hot flame and flame gases through the several sections in continuous transit, said current being reversed in direction at one point during its passage to produce a commingling of strata therein.

10. The continuous process of making cement clinker which comprises passing hot flame gases over a traveling stream of coarsely crushed cement materials to calcine the same, regrinding the calcined materials and passing the reground material as a traveling stream in proximity to a clinkering flame to produce clinker, said flame furnishing said flame gases.

11. The continuous process of making cement clinker which comprises producing a flame of temperature sufficient to induce clinkering in its immediate proximity, passing hot flame gases therefrom over a stream of coarsely crushed cement material to produce a calcination therein, regrinding the material so treated and passing the reground material as a stream in proximity to said flame and the flame gases coming therefrom, said material being exposed to the effect of said flame gases for a period at least seven times as long as it is exposed to the direct influence of said flame.

12. The continuous process of making cement clinker which comprises calcining a traveling stream of coarsely crushed cement material in a rotary kiln having a current of flame gases passing therethrough in opposite direction, removing and regrinding the calcines and returning to a rotary kiln for further treatment by a clinkering flame and the hot flame gases therefrom, said flame gases being passed into the first named kiln for effecting calcination therein and being commingled to destroy stratification therein in passing from the one kiln into the other.

13. The continuous process of making cement clinker which comprises producing a clinkering flame in the lower portion of an inclined rotary kiln apparatus, said flame being adapted to create clinkering conditions in a zone not occupying more than one-eighth the total length of said apparatus, passing coarsely crushed cement material through an upper part of said kiln apparatus in contact with flame gases coming from said flame until a calcination is effected, removing the treated materials and regrinding the same and returning the reground material to the kiln for further treatment by the flame and flame gases.

14. The continuous process of making cement clinker which comprises retaining hot flame gases from a clinkering flame in contact with a traveling stream of coarsely crushed cement material until said gases have acquired the minimum temperature necessary for stack draft and said material has undergone a calcination, passing the calcined material through a fine-grinding apparatus and passing the fine ground material as a traveling stream in proximity to a clinkering flame furnishing said hot gases, the flowing current of said hot gases being homogenized to remove stratification prior to contacting with said coarsely crushed material.

In testimony whereof, I affix my signature in the presence of two witnesses.

CARLETON ELLIS.

Witnesses:
GODFREY M. S. TAIT,
FLETCHER P. SCOFIELD.